(12) United States Patent
Medagam et al.

(10) Patent No.: US 12,334,848 B2
(45) Date of Patent: Jun. 17, 2025

(54) MULTILAYER PRINTED CIRCUIT BOARD DVDT FILTER WITH POWDER CORE TOROIDS

(71) Applicants: Peda V Medagam, Rapid City, SD (US); Nicholas R Kingsbury, Rapid City, SD (US)

(72) Inventors: Peda V Medagam, Rapid City, SD (US); Nicholas R Kingsbury, Rapid City, SD (US)

(*) Notice: Subject to any disclaimer, the term of this patent is extended or adjusted under 35 U.S.C. 154(b) by 155 days.

(21) Appl. No.: 18/206,365

(22) Filed: Jun. 6, 2023

(65) Prior Publication Data
US 2024/0413775 A1    Dec. 12, 2024

(51) Int. Cl.
*G01R 31/42*    (2006.01)
*H02P 21/00*    (2016.01)

(52) U.S. Cl.
CPC .................. *H02P 21/50* (2016.02)

(58) Field of Classification Search
CPC ............................ H02P 21/50; G01R 31/42
USPC ..................................... 318/400.02
See application file for complete search history.

(56) References Cited

U.S. PATENT DOCUMENTS

| | | | | |
|---|---|---|---|---|
| 4,937,540 A | * | 6/1990 | Carlson | H02M 3/155 363/39 |
| 2014/0300433 A1 | * | 10/2014 | Shudarek | H03H 7/1741 333/177 |
| 2018/0100889 A1 | * | 4/2018 | Swamy | G01R 31/2843 |
| 2019/0354154 A1 | * | 11/2019 | Yates | G06F 1/263 |

* cited by examiner

*Primary Examiner* — Gabriel Agared

(57) ABSTRACT

A multilayer printed circuit board dV/dT filter with powder core toroids includes an input terminal connecting powder core toroids and output terminals connecting the second end of powder core toroids. Damping resistors and shunt capacitors and resistors are connected using multilayer routing on printed circuit boards. The powder core toroid inductors reduce voltage spikes by increasing PWM switching times.

17 Claims, 2 Drawing Sheets

MULTILAYER PRINTED CIRCUIT BOARD DVDT FILTER WITH POWDER CORE TOROIDS

RELATED APPLICATIONS

This application claims priority to U.S. provisional patent application No. 63/349,280, filed Jun. 6, 2022, entitled "Multilayer Printed Circuit Board DVDT Filer with Powder Core Toroids", which is incorporated herein by reference.

TECHNICAL FIELD

The present invention relates to distributed gap pressed powder ferrite toroid cores used in printed circuit board dV/dT filters to reduce the size and losses of the filters.

BACKGROUND ART

VFDs today operate via pulse width modulation (PWM), with the inverter producing a continuous train of pulses rather than sinusoidal waveforms. These voltage pulses are transmitted to the motor terminals through the motor cable. When cable lengths are longer, their inductance increases. This causes greater delays in the time taken to charge the capacitance in the motor. When the voltage pulses reach the motor, they encounter a higher impedance than in the cable, causing the pulses to be reflected back to the drive. As these reflected waves encounter incoming waves, their values can add, causing higher peak voltage. Longer the cable, the greater the reflected wave (or overvoltage). More energy stored in the cable results in a higher over-voltage, which can be extremely damaging to the motor The use of IGBT (Insulated Gate Bipolar Transistors) in VFD has helped to improve VFD performance in several ways—lesser energy loss, the lesser requirement for cooling and smaller size footprint of the VFD device, minimized harmonics and reduced audible noise. However, the VFD is a known source of interference on both the input and output sides. The typical problems that may result on the output side of the VFD are listed below:

Excessive dv/dt and overvoltage
Eddy current and displacement current losses
Electromagnetic Compatibility issues
Overheating during the peak voltage
Service life and reliability issues with the motor
Low motor efficiency and power factor The dv/dt issue or overvoltage is the most important issue. In order to minimize losses in the VFD, the switching time or voltage rise time (measured as dv/dt) is much quicker in IGBTs due to the use of the Pulse Width Modulation (PWM) technique. The drive simulates a usable waveform modulated at very fast speeds, at the appropriate duration and polarity, to vary the speed of the electric motor. But as a consequence, the fast switching speed creates a problem for the motor due to excessive dv/dt. This measures the rise time and magnitude of the voltage on the edge of the cycle transitions.

The lead length is generally high between the VFD and the motor. There are several practical reasons for this. Motors may be installed outdoors (for instance, inside wells or mines). Whereas VFD is a sensitive electronic device that requires additional care and is usually kept in clean and dry indoor conditions. Because of this reason, a long length cable is used between them. Another scenario is when several motors on the line are connected to a single drive system, such as conveyor belts.

VFD manufacturers generally specify the maximum permissible cable length between the VFD and motor in their product specifications for optimum motor service life. These ranges may be between 30-100 m. When installed at a longer distance, motor failure may occur quite frequently.

IGBTs let drives turn the voltage on and off at a very high frequency, in the range of 4,000 to 16,000 times a second, although faster and slower rates may be used. As a result, the voltage rise time is very short (<few microseconds).

A dV/Dt filter is an RLC filter to reduce the voltage spikes generated by variable frequency drives and long lead motor cables.

Present-day inverters use IGBTs with fast rise and fall times. The advantages of fast switching time are lower switching losses but high dV/dT. Most of inverter-fed motors use long lead cables. Combining high dV/dT and long lead cables with high capacitance to ground causes voltage reflections in the cables and high ground and bearing currents.

dV/dT filters reduce the rate of rise of output PWM voltage by using L, C, and R components.

Different inductors are used in dV/dT filters, and the most common inductor types are gapper iron laminated core inductors. These inductors are heavy, have high losses, and are temperature-resistant.

SUMMARY OF THE INVENTION

A multilayer printed circuit board dV/dT filter with powder core toroids includes an input terminal connecting powder core toroids and output terminals connecting the second end of powder core toroids. Damping resistors and shunt capacitors and resistors are connected using multilayer routing on printed circuit boards. The powder core toroid inductors reduce voltage spikes by increasing PWM switching times.

BRIEF DESCRIPTION OF THE DRAWINGS

Details of this invention are described in connection with the accompanying drawings that bear similar reference numerals in which.

DETAILED DESCRIPTION OF THE INVENTION

A dV/dT filter for reducing the peaks of PWM voltages from the inverter includes PCB board, first, second, and third powder core inductors, damping resistors, shunt capacitors, and shunt resistors. One end of the first toroid inductor is connected to the input terminal and the other end of the first toroid is connected to the output terminal. Similarly, the second and third toroids are connected to the input and output terminals. Each shunt resistor are placed across the toroids. One end of the first shunt capacitor is connected to the second end of the toroid, and another end of the shunt capacitor connected to the shunt resistor. Similarly second and third shunt capacitors and shunt resistors are connected. The second end of all shunt resistors is connected to form a 'Y' configuration. All these components are connected on printed circuit boards with multilayer routing.

Figure 1:
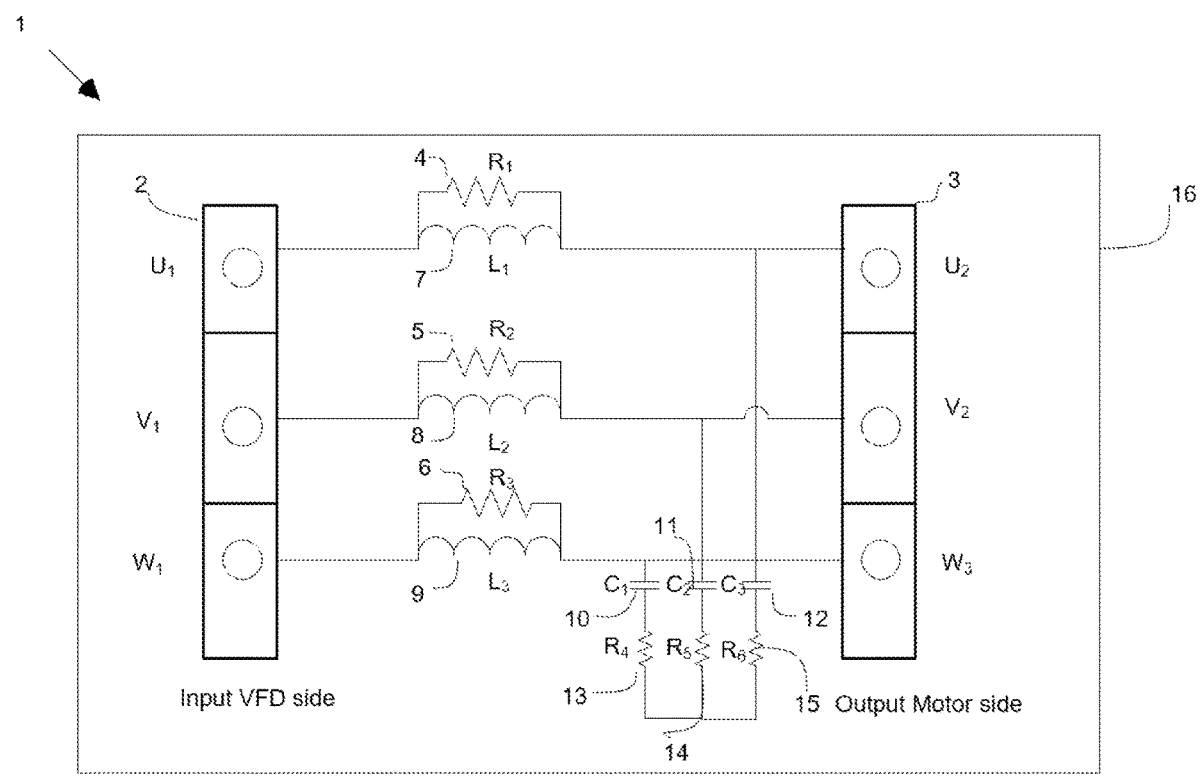
FIG. 1 is a schematic circuit diagram of a dV/dT filter embodying the features of the present invention.
Figure 2:
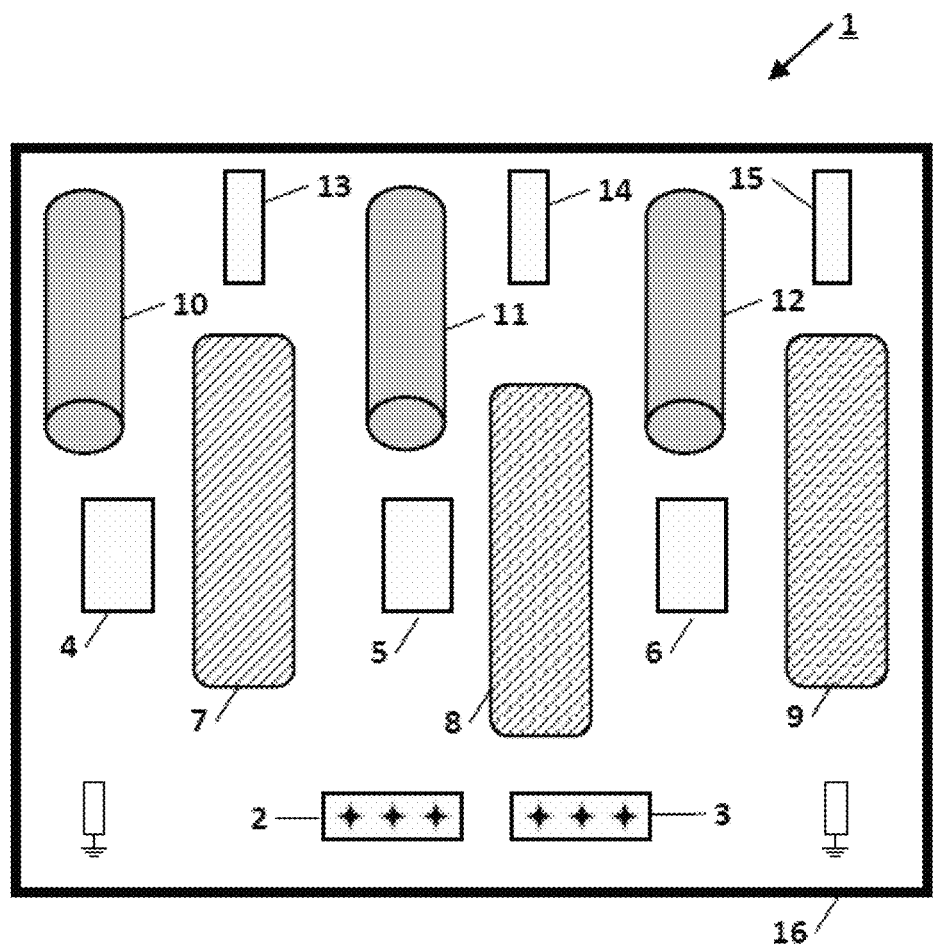
FIG. 2 is the actual PCB dV/dT filter picture.

Referring now to FIG. 1 and to FIG. 2, a dv/dt filter 1 for a three-phase motor control assembly is illustrated. The dv/dt filter 1 is assembled on a multilayer printed circuit board 16. A three-phase input assembly 2 is mounted to PCB 16 and constructed to receive a first ($U_1$), a second($V_1$) and a third ($W_1$) pulse width modulation (PWM) signal from a motor controller. Each PWM signal is modulated, for example, at between 4 k and 16 k pulses per second. It will be understood that slower and faster pulse rates may be used according to application specifics, such as the applied voltage and current requirement of the motor.

A three-phase power output assembly 3 is also mounted to PCB 16 and constructed to output a first phase ($U_2$), a second phase ($V_2$) and a third phase ($W_2$) power signal to a three-phase motor. It will be understood that the three-phase outputs may support a wide range of motor voltages, for example 240, 480 or higher.

A first powder core toroid inductor 7 is coupled between the first PWM signal $U_1$ and the first phase output signal $U_2$; a second powder core toroid inductor 8 is coupled between the second PWM signal $V_1$ and the second phase output signal $V_2$; and a third powder core toroid inductor 9 is coupled between the third PWM signal $W_1$ and the third phase output signal $W_2$. Toroid inductor 7 has a damping resistor 10 coupled in parallel. Toroid inductor 8 has a damping resistor 11 coupled in parallel. Toroid inductor 9 has a damping resistor 12 coupled in parallel. A damping resistor acts to limit harmonic oscillations, thereby reducing noise and reducing signal losses. It is well known how to set the size of damping resistors in an LRC circuit. Typically, the damping resistors will be power resistors in the range of 150 to 400 ohms and capable of handling between 40 W and 100 watts. It will be understood that other resistance and power ratings may be used.

In some cases, the powder core inductors (7, 8, 9) are constructed with parallel layers of windings on toroids. The number of layers can be selected according to application requirements, but generally, between 2 and 4 has been found to further enhance the efficiency and effectiveness of the dv/dt 1 filter.

A first shunting capacitor 4 couples toroid inductor 7 to ground. In some cases, a shunting resistor 13 may be placed in series with a shunting capacitor 4. A second shunting capacitor 5 couples toroid inductor 8 to ground. In some cases, a shunting resistor 14 may be placed in series with a shunting capacitor 5. A third shunting capacitor 6 couples toroid inductor 7 to ground. In some cases, a shunting resistor 15 may be placed in series with a shunting capacitor 6. Shunt capacitors help ease the lag between the current and voltage that occurs after an inductive load to the transmission line. Shunts with a capacitor are sometimes applied in circuits where high-frequency noise is a problem. Before the undesired signal reaches the circuit elements, the capacitor redirects the noise to the ground.

A resistor that is placed across a parallel resonant circuit or in series with a series resonant circuit to decrease the Q factor and thereby eliminate ringing. It is well known how to set the size of shunting capacitors are resistors in an LRC circuit. Typically, the shunting capacitors will be high-frequency power capacitors in the range of 0.075 to 0.15 microfarads, and the shunting resistors are low power resistors typically in the range of 2K and 4K Ohms. It will be understood that other capacitance and power resistance may be used.

With regard to PWM switching frequencies, it is an important advantage that the inventive dv/dt filter 1 is not limited to specific switching frequencies such as 4K, 8K, or 20K. It is designed to work effectively with any switching frequency.

With regard to operating voltages for the motor, it is an important advantage that the inventive dv/dt filter 1 is not restricted by the hard pulse voltage of either 240V or 480V. The dv/dt filter 1 is capable of accommodating a wider range of voltages, providing greater flexibility and compatibility.

Advantageously, dv/dt filter1 is constructed to work using distributed airgap toroids instead of gapped iron laminated cores. This innovative design choice offers several benefits, including improved performance and reliability.

What is claimed is:

1. A dv/dt filter for a three-phase motor control assembly, comprising:
   a multilayer printed circuit board (PCB);
   a three-phase input assembly mounted to the PCB and constructed to receive a first, a second and a third pulse width modulation (PWM) signal;
   a three-phase power output assembly mounted to the PCB and constructed to output a first phase, a second phase, and a third phase power signal to a motor;
   a first powder core toroid inductor coupled between the first PWM signal and the first phase output signal;
   a second powder core toroid inductor coupled between the second PWM signal and the second phase output signal;
   a third powder core toroid inductor coupled between the third PWM signal and the third phase output signal;
   wherein each of the first, second and third toroid inductors has a respective damping resistor for reducing oscillation harmonics; and
   wherein each of the first, second and third phase power signals has a respective shunting capacitor for grounding high frequency noise.

2. The dv/dt filter according to claim 1, wherein each powder core toroid inductor is constructed with parallel winding layers.

3. The dV/dt filter of claim 1, wherein the toroid cores are made of distributed air gap materials.

4. The dv/dt filter according to claim 1, wherein each PWM signal is modulated at about 4 k, 8 k or 20 k pulses per second.

5. The dv/dt filter according to claim 1, wherein each PWM signal is modulated a rate over 20 k pulses per second.

6. The dv/dt filter according to claim 1, wherein each of the PWM signals a maximum pulse voltage of 240 volts.

7. The dv/dt filter according to claim 1, wherein each of the PWM signals a maximum pulse voltage of 480 volts.

8. The dv/dt filter according to claim 1, wherein each respective shunting capacitor has a respective shunting resistor between each respective shunting capacitor and ground.

9. A dv/dt filter for a three-phase motor control assembly, comprising:
   a substrate;
   a three-phase input assembly mounted to the substrate and constructed to receive a first, a second and a third pulse width modulation (PWM) signal;
   a three-phase power output assembly mounted to the substrate and constructed to output a first phase, a second phase, and a third phase power signal to a motor;
   a first powder core toroid inductor coupled between the first PWM signal and the first phase output signal;
   a second powder core toroid inductor coupled between the second PWM signal and the second phase output signal;
   a third powder core toroid inductor coupled between the third PWM signal and the third phase output signal; and wherein each of the first, second and third toroid inductors has a respective damping resistor for reducing oscillation harmonics.

10. The dv/dt filter according to claim 9, wherein each of the first, second and third phase power signals has a respective shunting capacitor for grounding high frequency noise.

11. The dv/dt filter according to claim 10, wherein each respective shunting capacitor has a respective shunting resistor between each respective shunting capacitor and ground.

12. The dv/dt filter according to claim 9, wherein each powder core toroid inductor is constructed with parallel winding layers.

13. The dV/dt filter of claim 9, wherein the toroid cores are made of distributed air gap materials.

14. The dv/dt filter according to claim 9, wherein each PWM signal is modulated at about 4 k, 8 k or 20 k pulses per second.

15. The dv/dt filter according to claim 9, wherein each PWM signal is modulated at a rate over 20 k pulses per second.

16. The dv/dt filter according to claim 9, wherein each of the PWM signals a maximum pulse voltage of 240 volts.

17. The dv/dt filter according to claim 9, wherein each of the PWM signals a maximum pulse voltage of 480 volts.

\* \* \* \* \*